United States Patent Office 2,814,606
Patented Nov. 26, 1957

2,814,606
CURING PROCESS FOR POLYURETHANE REACTION PRODUCTS

Frederic B. Stilmar, Wilmington, Del., assignor to E. I. du Pont de Nemours and Company, Wilmington, Del., a corporation of Delaware No Drawing. Application May 31, 1955, Serial No. 512,280

8 Claims. (Cl. 260—42)

This invention relates to the preparation of polyurethane elastomers and more particularly to a process of curing these elastomers.

Curable elastomers having valuable properties may be prepared by reacting a long-chain polyalkylene ether glycol with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in copending application Serial No. 365,270 of Hill, filed June 30, 1953. Similar products are obtained by reacting together a high molecular weight organic bischloroformate, an organic diamine and phosgene, as described in copending application Serial No. 461,657 of Carter and Ernsberger, filed October 11, 1954. Other useful polyurethane elastomers may be prepared by reacting a high molecular weight polyester with a molar excess of an organic diisocyanate and a chain-extending agent, as described for example by Bayer et al. in Angewandte Chemie, 62, 57–66 (1950).

Products of this type may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportion of reactants has been such that few free isocyanate groups are present, or if the uncured reaction product has been stabilized against premature curing by the addition of some material such as a primary or secondary amine which reacts with and ties up the free isocyanate groups, it is necessary to add a curing agent prior to heating to effect vulcanization. The curing agents ordinarily employed are diisocyanates. When the conventional diisocyanates such as tolylene diisocyanates are used as curing agents, difficulty is often encountered because of the great reactivity of these compounds which results in premature curing or "scorching" of the elastomer before the curing agent can be thoroughly incorporated. This results in a non-uniform cure and interferes with the production of molded articles, since it may not be possible to force the partially cured product to fill the mold completely. At the same time, these polyurethane elastomers are often difficult to mill on ordinary rubber processing machinery, which presents a distinct problem in the commercial processing of these elastomers.

It is an object of this invention to provide a method for curing polyurethane elastomers. A further object is to provide a method for curing polyurethane elastomers of the types hereinafter described which reduces the tendency toward scorching and which provides for improved millability. Other objects will appear hereinafter.

It has now been found that, according to the present invention, a stable uncured polyurethane reaction product which is curable by heating with an organic polyisocyanate and which contains substantially no free isocyanate groups may be cured with reduced danger of scorching and with improved millability by first incorporating therewith from 5 to 20% by weight of an isocyanate-terminated polymer having the general structure:

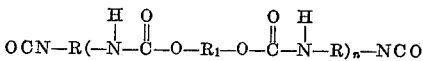

wherein R is an arylene radical, $R_1$ is a polyalkylene ether glycol residue of a molecular weight of at least 750 and $n$ is a small whole number, thereafter incorporating from 1 to 20% by weight of an arylene diisocyanate curing agent, and heating the mixture until a cured elastomer is formed.

In a preferred embodiment of this invention, the reaction product of a polytetramethylene ether glycol having a molecular weight between 750 and 3,500, a molar excess of a tolylene diisocyanate, and water, said reaction product containing substantially no free isocyanate groups, is first mixed with from 5 to 20% by weight of an isocyanate-terminated polymer formed by the reaction of a polytetramethylene ether glycol and a molar excess of a tolylene diisocyanate, then with from 1 to 20% by weight of 1,3-bis(3-isocyanato-4-methylphenyl)urea, and the mixture is heated at a temperature of between about 90 and 150° C. to effect curing.

The isocyanate-terminated polymer which is added to the uncured polyurethane reaction product as a processing additive is prepared by reacting a polyalkylene ether glycol with an excess of an arylene diisocyanate so as to produce a diisocyanate having the general structure

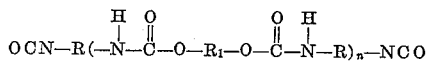

wherein R is an arylene radical, $R_1$ is a polyalkylene ether glycol residue and $n$ is a small whole number. The ratios of arylene diisocyanate to polyalkylene ether glycol will determine the molecular weight of the additive; however, in general, the value of $n$ is from 1 to 5 so that the molecular weight of the resulting diisocyanate is not too great. While polyalkylene ether glycols of molecular weight about 500 may be used, the molecular weight range of $R_1$, in the above recited formula, which is most useful as the molecular weight of the polyalkylene ether glycol is from about 750 to about 3,500. Beyond this range, the molecular weight of the resulting diisocyanate is so great that the weight percent required to replace a molal equivalent of the diisocyanate curing agent is too large a proportion of the elastomer and thus they do not lend themselves very readily as processing aids.

The polyalkylene ether glycols which are reacted with an excess of an arylene diisocyanate so as to yield the diisocyanate processing additive which is added to the uncured polyurethane are compounds which are derived from the polymerization of cyclic ethers such as alkylene oxides or dioxolane or from the condensation of glycols. For purposes of the present invention, the preferred glycol is polytetramethylene ether glycol; however, polyethylene ether glycol, polypropylene ether glycol and poly-1,2-dimethylethylene ether glycol are representative of other operable compounds. As representative of the many arylene diisocyanates which may be used to react with the polyalkylene ether glycols are 2,4-tolylene diisocyanate, 4-tertiary-butyl-m-phenylene dissocyanate, 4-methoxy-m-phenylene dissocyanate, 4-propyloxy-m-phenylene diisocyanate, 4-chloro-m-phenylene diisocyanate, 4-bromo-m-phenylene diisocyanate and 4-phenoxy-m-phenylene diisocyanate.

The amount of diisocyanate processing additive which is added to the uncured polyurethane should range from about 5 to 20% by weight. With less than about 5%, no substantial improvement is secured while amounts greater than 20% have no particular beneficial effect on the uncured polyurethane and, in fact, may tend to make it sticky on the mill. The amount of diisocyanate curing agent which is subsequently added is somewhat less critical and may range from 1 to 20%, although from 1 to 8% is ordinarily sufficient.

In carrying out the process of the present invention, the uncured elastomeric reaction product is mechanically worked on a rubber mill until it forms a smooth sheet and rolling bank at the nip of the rolls. Compounding agents such as carbon black, etc., may be added if desired. The necessary amount of the diisocyanate processing additive is then added while milling is continued and after thorough mixing, the diisocyanate curing agent is milled in and the compounded mass is sheeted off the mill for subsequent curing, ordinarily by heating. Temperatures of about 90 to 150° C. are normally used and only enough pressure is required to force the compounded elastomer into the mold. These pressures may range from about 30 pounds up to about 3,000 pounds per square inch. At the temperatures mentioned above, from 15 to 45 minutes is usually sufficient to produce a cure. Curing may also be effected without using pressure and at ordinary temperatures, but longer times are then required.

Since the diisocyanate additive, which is incorporated with the uncured elastomeric reaction product, has terminal isocyanate groups, it is believed that in the curing step these isocyanate groups react with active hydrogens on the elastomer and, in effect, act as auxiliary curing agents. Thus, this diisocyanate additive eventually becomes a part of the elastomer. These diisocyanate additives are usually soluble in the uncured elastomer which possibly accounts for their anti-scorch action since the isocyanate groups have a chance to react preferentially with particularly active hydrogens.

The actual order of incorporation of the ingredients in the curing process of the present invention is immaterial except for the fact that the diisocyanate processing additive must be incorporated into the uncured elastomeric reaction product before the diisocyanate curing agent is incorporated.

The polymeric reaction products which may be cured according to this invention include those which are prepared from polyalkylene ether glycols, diisocyanates and chain-extending agents, as disclosed and claimed in pending application Serial No. 365,270 of Hill, filed June 30, 1953. The term "polyalkylene ether glycol" refers to a polyalkylene ether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the uncured polyurethane reaction product may be represented by the formula $HO(RO)_nH$, in which R stands for an alkylene radical and $n$ is an integer sufficiently large that the molecular weight of the compound is at least 750, i. e., large enough that the polyoxyalkylene group $(RO)_n$— has a formula weight of at least 732. Not all of the alkylene radicals present need be the same. Glycols containing a mixture of radicals, as in the compound $HO(CH_2OC_2H_4O)_nH$ can be used. These glycols are either viscous liquids or waxy solids. To be of value in preparing elastomers, the molecular weight of the glycol should be at least 750 and may be as high as 10,000. It is preferably between 750 and 3,500. Polytetramethylene ether glycol, also known as polybutylene ether glycol, is the preferred glycol. Polyethylene ether glycol, polypropylene ether glycol and poly-1,2-dimethylethylene ether glycol are representative of other operable compounds.

Any of a wide variety of diisocyanates may be used in the polymerization to prepare the uncured polyurethane reaction product. Aromatic diisocyanates, such as 2,4-tolylene diisocyanate, 4,4'-methylene-bis(phenyl isocyanate), 1,5-naphthylene diisocyanate and m-phenylene diisocyanate, are preferred. Aliphatic compounds such as hexamethylene diisocyanate and tetramethylene diisocyanate, and the alicyclic compounds such as 1,4-cyclohexylene diisocyanate are also operable.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described by Kohler in J. Am. Chem. Soc. 49, 3181 (1927). When water is employed as the chain extender, it is capable of reacting with two isocyanate groups with the evolution of carbon dioxide to form a urea group linking the polymer fragments to which the isocyanate groups were attached. Urea linkages are also formed if a diamine such as 2,4-tolylenediamine or ethylene diamine is used as the chain-extending agent. Other useful chain extenders include ethylene glycol, adipamide, p-aminobenzoic acid, monoethanolamine, 1,4-cyclohexanedisulfonamide, succinic acid, and hydroxypropionic acid.

In the preparation of the uncured polymer, an excess of the diisocyanate over the polyalkylene ether glycol is used, which may be only a slight excess or may be up to a 12:1 molar ratio. The glycol and the diisocyanate are ordinarily reacted by heating with agitation at a temperature of between 70° and 120° C. The chain-extending agent is then added and heating and mixing are continued at about 80° to 100° C. During this period the molecular weight of the reaction product increases and the mass gradually forms rubbery chunks. It is then removed from the mixer and sheeted out on a rubber mill. If all of the free isocyanate groups have not reacted with the glycol or the chain-extending agent, the elastomer will have a tendency to cure rather rapidly. If the reaction product is to be stored prior to the addition of the diisocyanate processing additive and curing agent, it is then necessary to stabilize it by adding some material such as primary or secondary nitrogen base in amount sufficient to react with the remaining free isocyanate groups, as disclosed and claimed in application Serial No. 379,291 of Nelson et al., filed September 9, 1953. This stabilized polymer and the self-stabilized polymer which results when enough glycol and chain-extending agent have been used to tie up all the isocyanate groups may be stored for considerable periods without losing their ability to form a smooth band when milled on a rubber mill.

Instead of the hydrocarbon portion of the polyether glycols used in forming these products being entirely alkylene, the compound can contain arylene or cycloalkylene radicals together with the alkylene radicals, as, for example, in the condensation product of a polyalkylene ether glycol with α,α'-dibromo-p-xylene in the presence of alkali. In such products, the cyclic groups inserted in the polyether chain are preferably phenylene, naphthylene or cyclohexylene radicals or these radicals containing alkyl substituents. Elastomers made using polyalkylene-arylene or polyalkylene-cycloalkylene ether glycols have improved freeze resistance as compared with the corresponding elastomers containing no cyclic radicals.

Another class of glycols useful in making curable polyurethanes according to this invention are the polyether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the glycol has a molecular weight of at least 750. These products may be made by condensing together glycols and thioglycols in the presence of a catalyst such as p-toluene sulfonic acid.

There may also be used in the process of this invention, products made by the reaction of a diisocyanate and a chain-extending agent with a long chain compound having a molecular weight of at least 750 and having at each end a functional group terminating in a hydroxyl group, said functional groups being connected by a hydrocarbon or a halogen-substituted hydrocarbon chain. The functional groups at the ends of the long chain compound may be hydroxyl, carboxyl or sulfo radicals, and are preferably hydroxyl. The hydrocarbon chain connecting the functional groups is free of substituents other than halogen atoms and monovalent hydrocarbon radicals, such as methyl, phenyl, etc., preferably containing no more than 8 carbon atoms. Such long chain compounds are obtained, for example, by polymerizing ethylenically unsaturated monomers in the presence of free radical catalysts such as the aliphatic azo dinitriles or dicarboxylates. The most suitable ethylenically unsaturated monomers are conjugated dienes such as butadiene, isoprene, 2-chlorobutadiene and the like. Mixtures may be used. For example, styrene or isobutylene may be copolymerized with a diene to give the long chain skeleton. The carbon chain in the long chain compound may be saturated or unsaturated.

Also included in the products which may be cured according to this invention are those made from a high molecular weight, substantially linear polyester, an organic diisocyanate, and a chain-extending agent of the type previously described. Products of this sort are described in the aforementioned Bayer article in Angewandte Chemie, and in U. S. Patents 2,621,166; 2,625,531 and 2,625,532. The polyesters are prepared by reacting together glycols such as ethylene glycol, 1,2-propylene glycol, 2,3-butylene glycol, and 1,6-hexylene glycol, and dicarboxylic acids such as adipic, pimelic, sebacic, oxalic and pthalic acids and decamethylene dicarboxylic acid. The polyesters may be represented by the formula HO[R.OOC.R'.COO]$_n$ROH in which R and R' are hydrocarbon radicals derived from the glycol and dicarboxylic acid respectively and $n$ is an integer large enough that the molecular weight of the compound as a whole is at least 750 and that the polyester group —[R.OOC.R'.COO]$_n$.RO— has a formula weight of at least 732. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates. The same diisocyanates, chain-extending agents and reaction conditions useful in preparing elastomers from the polyalkylene ether glycols are also useful with the polyesters.

Elastomers which are similar to those formed from the reaction between long chain glycols of the types mentioned above, diisocyanates and water may be made from the reaction of a high molecular weight organic bis-chloroformate, an organic diamine and phosgene, as described and claimed in pending application Serial No. 461,657 of Carter et al., filed October 11, 1954. These products may be cured advantageously by the process of this invention.

The organic diisocyanate curing agents which are useful in the process of the present invention and which are added subsequent to the addition of the processing additive, include such compounds as 1,3-bis(3-isocyanato-p-tolyl)urea, 4,4'-methylene di-o-tolylisocyanate, 2,4-tolylene diisocyanate, the dimer of 2,4-tolylene diisocyanate, 4-tertiary-butyl-m-phenylene diisocyanate, 4-methoxy-m-phenylene diisocyanate, 4-propyloxy-m-phenylene diisocyanate, 4-chloro-m-phenylene diisocyanate, 4-bromo-m-phenylene diisocyanate and 4-phenoxy-m-phenylene diisocyanate.

The tendency of the compounded elastomers to cure prematurely or to scorch may be measured by the Mooney Scorch Test. This is a standard method of determining the curing characteristics of elastomers by use of a shearing disc viscometer. It is ASTM Test D-1077-49 T as described in "ASTM Standards on Rubber Products," published by the American Society for Testing Materials. This test measures the change in viscosity of the curable mixture as a function of time, while the sample is held at a specific temperature. The compositions described in the examples which follow were tested at 100° C. using a small rotor. As the Mooney scorch time increases and as the Mooney viscosity decreases, the elastomer becomes safer to process. Low Mooney viscosities mean there will be less heat buildup in mills, extruders, etc., and, therefore, the processing temperature will be lower. This in turn means that the curing of the elastomer proceeds more slowly and, therefore, a longer time in the processing equipment is permissible before premature curing or scorch occurs.

As pointed out above the diisocyanate additive which is incorporated with the uncured elastomer improves the millability of said elastomer by rendering the elastomer noticeably softer, and thus acts as a plasticizer. The softness is measured by means of a Shore durometer according to ASTM Test D-676-49 T ("ASTM Standards on Rubber Products"—1951). The scale of hardness runs from 0 to 100 from soft to hard. The test depends on the indentation of the rubber by means of a spring loaded indentor. The figures given in the examples are obtained using a durometer with the Shore "A" scale.

The following examples will better illustrate the nature of the invention. However, the invention is not intended to be limited to these examples. Parts are by weight unless otherwise indicated.

EXAMPLE 1

A. *Preparation of elastomer*

180 parts of polytetramethylene ether glycol, having a molecular weight of 935 and containing 0.01% water, and 22.27 parts of 2,4-tolylene diisocyanate are mixed together in a Werner-Pfleiderer mixer at 100–105° C. for 3 hours. The viscous mass is cooled to 70–75° C. and 0.36 part of water is added and mixed in for 15 minutes. 25.75 parts of 2,4-tolylene diisocyanate is then added and mixing is continued an additional 2 hours at 70–75° C. 8.1 parts of water is then added and mixing is continued for 20 minutes while the temperature rises from 70° C. to 100° C. The rubbery polymer is promptly removed from the mixer and milled on a rubber mill while 0.5 part of piperidine per 100 parts of polymer is milled in to stabilize it.

B. *Preparation of diisocyanate plasticizer*

One molar proportion of polytetramethylene ether glycol of molecular weight 2400 and 2 molar proportions of 2,4-tolylene diisocyanate are mixed to a homogeneous mass and held at 50–55° C. for 16 hours. The resultant diisocyanate may be represented by the formula

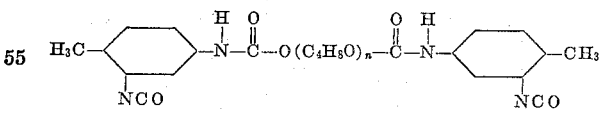

where $n$ is a number so as to give an average molecular weight of 2382 to the (C$_4$H$_8$O) radical.

C. *Formulation of curable composition*

(1) 50 parts of elastomer "A" is put on a rubber mill and milled at 130° C. for 10 minutes, after which it is cooled to 60–70° C. and 8.5 parts of plasticizer "B" is added and milling is continued. 3 parts of 1,3-bis(3-isocyanato-p-tolyl)urea is then added, and milling is continued for 5 minutes at 60–70 C. and then for 6 minutes longer while the temperature is raised 10° C. every 2 minutes. The compounded polymer is then sheeted off the mill.

(2) A control is made in the same way except that no diisocyanate plasticizer is added and 4 parts of 1,3-bis(3-isocyanato-p-tolyl)urea is added. This yields an amount of isocyanate equivalent to the isocyanate content in (1) above.

Both samples are then subjected to the Mooney scorch test described above.

|  | 1 | 2 |
|---|---|---|
| Minimum reading | 29 | 54 |
| Minutes to reading of 64 (10 points above control minimum) | 55 | 13 |

A comparison of the times required to reach a 64 reading is a measure of the improvement in scorch-resistance or safety-processing which is about 4 to 1 in this case.

Portions of each of the compounded stocks are cured in molds in a press at 134° C. for 1 hour. The durometer hardness (Shore "A") is 68 for (1) and 74 for the control (2). This is a significant improvement in softness due to the plasticizer.

EXAMPLE 2

A. *Preparation of elastomer (same as Example 1–A)*

B. *Diisocyanate plasticizer*

1820 parts of a polytetramethylene ether glycol, having a molecular weight of about 910 and containing 0.007% water, and 524 parts of 2,4-tolylene diisocyanate are thoroughly mixed together and held at 50–55° C. for 16 hours. The resulting compound is a viscous liquid.

C. *Formulation of curable composition*

(1) 100 parts of elastomer "A" is milled on a rubber mill at 120° C. for 10 minutes and then cooled to 60–70° C., at which time 15 parts of the plasticizer "B" is added and milled in for 5 minutes. 6 parts of 1,3-bis(3-isocyanato-p-tolyl)urea is then added and milling continued for 5 minutes.

(2) A control is made in the same way except that no plasticizer is added and 8 parts of 1,3-bis(3-isocyanato-p-tolyl)urea is used. The isocyanate content is equivalent to that in (1) above.

Both samples are subjected to the standard Mooney scorch test.

|  | 1 | 2 |
|---|---|---|
| Minimum reading | 28 | 54 |
| Minutes to reach reading of 64 (10 points above control minimum) | 35 | 13 |

The scorch advantage here is about 2.5 times the control.

Samples cured in a press at 134° C. for 1 hour show durometer hardness values of 67 for (1) and 74 for the control (2) which again shows the softening effect of the plasticizer.

EXAMPLE 3

A. *Preparation of elastomer (same as Example 1–A)*

B. *Diisocyanate plasticizer*

1820 parts of polytetramethylene ether glycol of molecular weight 910 and 662 parts of 2,4-tolylene diisocyanate are thoroughly mixed and heated at 50–55° C. for 16 hours.

C. *Formulation of curable composition*

(1) 100 parts of the elastomer "A" is put on a rubber mill and 15 parts of a conductive channel black is added and the mass milled for 10 minutes at 120–130° C. The mass is cooled to 60–70° C. and 5 parts of the plasticizer is then milled in for 5 minutes followed by 7 parts of 1,3-bis(3-isocyanato-p-tolyl)urea which is milled in for 5 minutes.

(2) A control is made without the addition of the plasticizer and using 8 parts of 1,3-bis(3-isocyanato-p-tolyl)urea. The isocyanate content is equivalent to that in (1) above.

The Mooney scorch data are as follows:

|  | 1 | 2 |
|---|---|---|
| Minimum reading | 48 | 70 |
| Minutes to reading of 80 (10 points above the minimum of control) | 34 | 15 |

It is to be noted that the minimum of 70 for the control means an elastomer processable only with difficulty. The sample (1) did not have a Mooney reading of 70 until 27 minutes from its minimum.

EXAMPLE 4

A. *Preparation of elastomer*

455 parts of polytetramethylene ether glycol, having a molecular weight of 910 and containing 0.007% water, 6.5 parts of water and 116.5 parts of 2,4-tolylene diisocyanate are charged into a Werner-Pfleiderer mixer and mixed thoroughly at room temperature. Mixing is continued while raising the temperature gradually as follows:

30–75° C. _____minutes__ 45
75–110° C. _____do_____20
110–135° C. _____do____ 45
130–135° C. _____hours____1

The resulting elastomer is soft and readily millable.

B. *Diisocyanate plasticizer (same as example 3–B)*

C. *Formulation of curable composition*

(1) 50 parts of elastomer "A" above and 10 parts of conductive channel black are milled on a rubber mill at 130° C. for 10 minutes. The mass is cooled to 60–70° C. and 2.5 parts of the diisocyanate plasticizer is milled in for 5 minutes and then 2 parts of 1,3-bis(3-isocyanato-p-tolyl)urea is milled in. The polymer is sheeted from the mill.

(2) A control is prepared using no plasticizer and 2.5 parts of 1,3-bis(3-isocyanato-p-tolyl)urea.

On subjecting these to the Mooney scorch test, the following results were obtained:

|  | 1 | 2 |
|---|---|---|
| Minimum reading | 35 | 45 |
| Minutes to read 55 (10 point rise for control) | 22 | 9 |

The durometer hardness of samples cured in a press for 1 hour at 134° C. was 72 for (1) and 75 for (2), again showing that the plasticized sample is the softer.

EXAMPLE 5

A. *Preparation of elastomer*

450 parts of polytetramethylene ether glycol, having a molecular weight of 910 and containing 0.007% water, and 96.4 parts of 2,4-tolylene diisocyanate are mixed in a Werner-Pfleiderer mixer for 2.5 hours at 125° C. The mass is then cooled to 60° C. and 10 parts of m-tolylene diamine dissolved in 20 parts of tetrahydrofuran is added. Mixing is started and the temperature is raised to 130–135° C. and continued for 1 hour, during which time the tetrahydrofuran evaporates. The reaction mass is removed from the mixer. It is solid at room temperature, resembling taffy.

B. *Diisocyanate plasticizer*

1860 parts of polytetramethylene ether glycol, having a molecular weight of 930 and containing 0.018% water, and 467 parts of 2,4-tolylene diisocyanate are thoroughly stirred together and then held at 50–55° C. for 16 hours.

C. *Formulation of curable composition*

(1) 40 parts of elastomer "A" is milled on a rubber mill at 130° C. for 10 minutes and then cooled to 60–70° C. 8 parts of plasticizer "B" is added and milled in for 5 minutes followed by the addition of 1.6 parts of 1,3-bis(3-isocyanato-p-tolyl)urea. After milling for 4 minutes at 90–100° C. a smooth rubbery sheet showing no indication of scorch is cut from the mill rolls. A portion is cured in a press for 1 hour at 134° C. to form a smooth rubbery slab with good resistance to tear.

(2) A control is prepared using 2.4 parts of 1,3-bis(3-isocyanato-p-tolyl)urea and no plasticizer.

On heating to 90–100° C., the band has scorched by the end of 4 minutes, and it is full of holes and shreds badly in the bank. It is removed from the mill and cured in a mold for 1 hour at 134° C. The resulting slab is rough, and non-homogeneous due to the presence of precured (or scorched) polymer and the tear resistance is markedly inferior to (1) and it is also much harder or more plastic-like and less rubbery than (1).

Although this invention is particularly useful and has been illustrated with particular reference to elastomers formed from polyalkylene ether glycols, diisocyanates and chain-extending agents, it has application generally to the curing of any elastomeric materials composed of polymeric chains containing reactive hydrogen atoms and which may be cured by cross-linking at the active hydrogen sites.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles.

The basic elastomeric properties of these products may be varied by suitable compounding. The type and amount of the compounding agent to be used is dependent upon the use for which the elastomer is intended. Some of the more important compounding agents which are of value with these elastomers are carbon black, clay, silica, talc, zinc, calcium and magnesium oxides, titanium dioxide and plasticizers. Inorganic and organic coloring agents may be incorporated to give well defined colored products. The natural color of the elastomer is a pale yellow or a light amber.

The compounding agents may be mixed or incorporated with the product at the same time the diisocyanate curing agents are added. Conventional rubber processing machinery such as rubber mills and Werner-Pfleiderer or Banbury mixers may be used. The resulting compounded stocks may be shaped or cured in conventional rubber industry equipment. Alternatively, the stocks may be dissolved or extended with solvents for application to surfaces upon which they may be cured after evaporation of the solvent.

As many widely different embodiments of this invention may be made without departing from the spirit and scope thereof, it is to be understood that this invention is not limited to the specific embodiments thereof except as defined in the appended claims.

What is claimed is:

1. The process of curing a stable, uncured polyurethane reaction product, which is curable by heating with a polyisocyanate and which contains substantially no free isocyanate groups, which comprises incorporating therewith from 5 to 20% by weight of a compound having the general structure OCN—R(—NHCOO—$R_1$—OOCNH—R)$_n$—NCO wherein R is an arylene radical, $R_1$ is a polyalkylene ether glycol residue obtained by removing the terminal hydroxyl groups from a polyalkylene ether glycol having a molecular weight of from about 750 to about 3500 and $n$ is an integer from 1 to 5, thereafter incorporating therewith from 1 to 20% by weight of an organic diisocyanate curing agent to cross-link said uncured polyurethane reaction product, and heating the mixture until a cured elastomer is formed.

2. The process of claim 1 in which the diisocyanate curing agent is 1,3-bis(3-isocyanato-p-tolyl)-urea.

3. The cured elastomers obtained by the process of claim 1.

4. The process of claim 1 in which the polyurethane reaction product contains a plurality of intralinear polyoxyalkylene radicals, each having a formula weight of at least 732.

5. The process of claim 4 in which the polyoxyalkylene radicals are polyoxytetramethylene radicals.

6. The process of curing a stable, uncured reaction product of a polytetramethylene ether glycol having a molecular weight of from 750 to 10,000, a molar excess of tolylene diisocyanate and water, said reaction product containing substantially no free isocyanate groups, which comprises incorporating therewith from 5 to 20% by weight of a reaction product of a polytetramethylene ether glycol having a molecular weight of from about 750 to about 3500 and a molar excess of a tolylene diisocyanate, thereafter incorporating from 1 to 20% by weight of 1,3-bis(3-isocyanato-p-tolyl)urea and heating the mixture at a temperature between about 90 and 150° C. to produce a cured elastomer.

7. In the process of curing a stable, uncured polyurethane reaction product, which contains substantially no free isocyanate groups, by incorporating therewith from 1 to 20% by weight of an organic diisocyanate curing agent to cross-link said polyurethane reaction product and heating the mixture until a cured elastomer is formed, the step which comprises incorporating therewith prior to the addition of the curing agent from 5 to 20% by weight of a compound having the general structure OCN—R(—NHCOO—$R_1$—OOCNH—R)$_n$—NCO wherein R is an arylene radical, $R_1$ is a polyalkylene ether glycol residue obtained by removing the terminal hydroxyl groups from a polyalkylene ether glycol having a molecular weight of from about 750 to about 3500 and $n$ is an integer from 1 to 5.

8. The plasticized elastomers obtained by the process of claim 7.

References Cited in the file of this patent

UNITED STATES PATENTS 2,729,618    Muller et al. _____ Jan. 3, 1956